(12) United States Patent
Berger

(10) Patent No.: US 12,711,220 B1
(45) Date of Patent: Aug. 18, 2026

(54) EXECUTION ELIGIBILITY GATE FOR RELATIONAL AUTONOMOUS COMPUTATIONAL ENTITIES

(71) Applicant: RAIN HOLDINGS, INC., Laguna Beach, CA (US)

(72) Inventor: Marc Berger, Laguna Beach, CA (US)

(73) Assignee: Rain Holdings, Inc., Laguna Beach, CA (US)

( * ) Notice: Subject to any disclaimer, the term of this patent is extended or adjusted under 35 U.S.C. 154(b) by 0 days.

(21) Appl. No.: 19/444,979

(22) Filed: Jan. 9, 2026

(51) Int. Cl.
*G06F 21/44* (2013.01)
*G06F 21/62* (2013.01)

(52) U.S. Cl.
CPC ............ *G06F 21/44* (2013.01); *G06F 21/629* (2013.01)

(58) Field of Classification Search
CPC ........ G06F 21/44; G06F 21/445; G06F 21/45; G06F 21/55; G06F 21/57
See application file for complete search history.

(56) References Cited

U.S. PATENT DOCUMENTS 5,623,664 A 4/1997 Calvert et al.
6,675,191 B1 1/2004 Ito
9,296,101 B2 3/2016 Laurent et al.
9,430,662 B2 8/2016 Giambiagi et al.
11,755,754 B2 9/2023 Joshi et al.
12,452,369 B1 10/2025 Olejar, Jr. et al.
12,609,832 B1 4/2026 Gordon et al.
2009/0055901 A1* 2/2009 Kumar .................. G06F 21/604 726/4
2009/0094596 A1 4/2009 Kuiper et al.
2009/0288074 A1 11/2009 Carroll et al.
2009/0307466 A1 12/2009 Barsness et al.
2014/0365313 A1 12/2014 Reese et al.
2015/0223261 A1 8/2015 Bedekar et al.
2016/0162016 A1 6/2016 Lee et al.
2017/0032248 A1 2/2017 Dotan-Cohen et al.
2020/0043092 A1 2/2020 Brucato
2020/0076769 A1 3/2020 Mishra et al.
2022/0060391 A1 2/2022 Browne et al.
2022/0293289 A1 9/2022 Decrop et al.
2023/0118478 A1 4/2023 Rajanna
(Continued)

OTHER PUBLICATIONS

Hu, Vincent., Guide to Attribute Based Access Control (ABAC) Definition and Considerations, NIST Special Publication 800-162, National Institute of Standards and Technology, Gaithersburg, MD, Jan. 2014 (with updates as of Aug. 2, 2019).
(Continued)

*Primary Examiner* — Quazi Farooqui
(74) *Attorney, Agent, or Firm* — Wilson Sonsini Goodrich & Rosati

(57) ABSTRACT

Described herein are systems, methods, and media for gating execution of actions by autonomous or semi-autonomous computational entities. A proposed action may be evaluated by an execution eligibility gate configured to compute whether execution is permitted based on relational context associated with an initiating entity. Execution of the action may then be enabled, modified, or prevented by controlling an execution channel based on the computation. The architecture supports centralized, distributed, and federated environments and provides auditability of execution enforcement and execution outcomes.

30 Claims, 8 Drawing Sheets

(56) References Cited

U.S. PATENT DOCUMENTS

| | | | |
|---|---|---|---|
| 2023/0419274 | A1 | 12/2023 | Williams et al. |
| 2024/0037212 | A1* | 2/2024 | Rajendran ............. G06F 21/604 |
| 2024/0078515 | A1 | 3/2024 | Curry et al. |
| 2024/0146678 | A1 | 5/2024 | Diesch et al. |
| 2024/0163108 | A1 | 5/2024 | Grube |
| 2024/0250916 | A1* | 7/2024 | Aritsuka ................. H04L 63/08 |
| 2024/0394104 | A1 | 11/2024 | Tardif |
| 2025/0071578 | A1 | 2/2025 | Zhao et al. |
| 2025/0141873 | A1* | 5/2025 | Tao ........................ H04L 63/102 |
| 2025/0307436 | A1 | 10/2025 | Doyle et al. |
| 2025/0307538 | A1 | 10/2025 | Sarin |
| 2025/0307640 | A1* | 10/2025 | Belgi ................... G06N 3/0895 |
| 2025/0378383 | A1 | 12/2025 | Koh et al. |
| 2025/0384411 | A1 | 12/2025 | Krasnyansky |
| 2026/0010773 | A1 | 1/2026 | Fortkort |
| 2026/0019438 | A1 | 1/2026 | Pickman et al. |
| 2026/0067335 | A1 | 3/2026 | Tran |
| 2026/0111292 | A1 | 4/2026 | Ast |
| 2026/0119657 | A1 | 4/2026 | Zamir et al. |
| 2026/0121859 | A1 | 4/2026 | Arkoff et al. |
| 2026/0122112 | A1 | 4/2026 | Abotchie |
| 2026/0134441 | A1 | 5/2026 | Bickerstaff, III |
| 2026/0134442 | A1 | 5/2026 | Bickerstaff, III |

OTHER PUBLICATIONS

Mestci, Hazal., Best Practices of Authorizing AI Agents, OsoHQ.com (published Oct. 21, 2025; last updated Nov. 25, 2025), available at https://www.osohq.com/learn/best-practices-of-authorizing-ai-agents.

Pang, Caceres., Zanzibar: Google's Consistent, Global Authorization System, USENIX ATC 2019.

Liu, Yang et al., Experimental unconditionally secure bit commitment. Physical review letters. preprint arXiv:1306.4413.112:1, (2014).

Rzevski, George et al., Emergent Intelligence in Smart Ecosystems: Conflicts Resolution by Reaching Consensus in Resource Management. Mathematics, 10(11):1923 (2022).

U.S. Appl. No. 19/463,763 Office Action dated May 27, 2026.

U.S. Appl. No. 19/532,883 Office Action dated May 19, 2026.

* cited by examiner

EXECUTION ELIGIBILITY GATE FOR RELATIONAL AUTONOMOUS COMPUTATIONAL ENTITIES

BACKGROUND

Authorization mechanisms may be useful for regulating whether computational entities are permitted to perform certain operations or access certain resources. Such mechanisms can support orderly interaction between software components, services, and external systems, particularly where actions are performed on behalf of users, organizations, or other entities.

SUMMARY

Artificial intelligence systems are evolving from stateless tools that generate isolated outputs into persistent computational entities capable of interacting across time, coordinating with other entities, representing users or organizations, and initiating actions that produce binding effects in external systems. As these systems become increasingly autonomous and relational, the technical risk shifts from erroneous recommendations to unauthorized or illegitimate execution of actions.

Conventional authorization approaches-including role-based access control (RBAC), identity and access management (IAM), static permission tables, token-based authorization, approval workflows, and centralized policy engines-were designed for environments with static identities, predefined roles, and non-relational decision logic. These approaches are ill-suited for systems in which computational entities derive execution capability dynamically through relationships with other entities, act on behalf of multiple principals, synthesize outputs from multiple sources, or operate across distributed or federated environments.

As a result, there exists a technical problem in gating execution of actions by computational entities under conditions where execution eligibility depends on evolving relational context rather than static permissions. Without a dedicated execution eligibility gate controlling execution channels that produce externally observable effects, systems face increased exposure to unauthorized actions, inconsistent enforcement, lack of auditability, and heightened legal and operational liability. As used herein, an externally observable effect comprises a state transition such as, by way of non-limiting examples, resource commitments, transactions, representations, or operations occurring outside the computational entity itself.

Unlike identity- or attribute-based authorization systems that evaluate properties of a single requesting identity, execution eligibility as disclosed herein is computed from relational authority derived across multiple computational entities and their dynamically evolving interrelationships and is enforced by controlling execution channels such that proposed actions are prevented from executing absent satisfaction of execution eligibility conditions.

The systems, methods, and media disclosed herein provide an execution eligibility gate configured to determine whether a computational entity is permitted to initiate, represent, coordinate, modify, or bind an action that produces an externally observable effect, including a state transition, resource commitment, transaction, or binding representation in an external system.

In contrast to authorization or policy evaluation mechanisms that determine whether an action is permitted in principle, the execution eligibility gate described herein operates as a runtime control point that determines whether a proposed action is allowed to be executed at all. Execution eligibility functions as a condition precedent to execution, such that a proposed action is prevented from causing an externally observable state transition unless execution eligibility is satisfied. The execution eligibility gate operates in-line with one or more execution channels through which proposed actions would otherwise be carried out, such that execution eligibility is evaluated at or near execution time and directly governs whether execution proceeds or is prevented. The execution eligibility gate is architecturally distinct from components that synthesize authority, evaluate identity, apply policy, or record post-execution provenance. While such components may provide inputs to execution eligibility, the execution eligibility gate itself does not generate authority, reason about actions, or perform post-hoc audit, but instead solely governs whether execution of a proposed action is permitted to occur.

In some embodiments, a system receives a proposed action initiated by a computational entity and gates execution of the proposed action by computing execution eligibility based on relational context associated with the entity. The relational context may include delegated authority, lineage, scope limitations, temporal conditions, revocation status, multi-principal authority, and other dynamically updated relationships. Based on the execution eligibility gating, the system enables execution, modifies execution parameters, or prevents execution of the proposed action by controlling an execution channel through which the action would otherwise be carried out.

The execution eligibility gate does not merely produce advisory output. The execution eligibility gate directly controls whether an externally effective operation is executed, modified, or prevented by controlling an execution channel through which the proposed action would otherwise be carried out. Execution eligibility is determined at runtime and governs whether a proposed action is permitted to cause a state transition in an external system or execution environment. The execution eligibility determination is performed independently of internal reasoning, learned parameters, or training state of any computational model proposing the action, and is evaluated at or proximate to a time the proposed action would otherwise be executed using evolving relational context.

The systems, methods, and media described herein operate independently of static authorization mechanisms, predefined workflows, or fixed policy constructs, and are implementation-agnostic with respect to specific agent designs, trust metrics, storage mechanisms, or enforcement topologies. The execution eligibility gate may be deployed in centralized, distributed, federated, or hybrid computing environments.

Described herein is a computer-implemented system, comprising: one or more processors; and memory storing instructions that, when executed by the one or more processors, cause the system to: receive a proposed action initiated by a computational entity; identify relational context associated with the computational entity, the relational context comprising one or more dynamically updated relationships with other computational entities; gate execution of the proposed action by computing execution eligibility based on the relational context using one or more processors, wherein the gating is not based solely on a static authorization mechanism; and control an execution channel to enable execution, modify execution, or prevent execution of the proposed action in an external system based on the execution eligibility. In some embodiments, the relational context comprises delegated authority from another computational entity. In some embodiments, the computational entity acts on behalf of a user, organization, or external system. In some embodiments, execution eligibility is computed jointly across a plurality of computational entities. In some embodiments, the method further comprises resolving conflicting execution eligibility determinations using precedence or lineage. In some embodiments, execution eligibility is subject to temporal expiration or contextual conditions. In some embodiments, the method further comprises revoking execution eligibility based on a change in relational context. In some embodiments, enabling execution comprises preventing commitment of a transaction until execution eligibility is satisfied. In some embodiments, enabling execution comprises modifying a proposed action derived from a synthesized output of multiple computational entities. In some embodiments, preventing execution comprises blocking or rolling back the proposed action. In some embodiments, the relational context includes lineage information associated with the computational entity. In some embodiments, execution eligibility gating is performed prior to execution of the proposed action. In some embodiments, execution eligibility gating is performed during execution of the proposed action. In some embodiments, execution eligibility gating is performed after execution of the proposed action to enable post-execution enforcement. In some embodiments, relational context is updated dynamically based on interactions among computational entities. In some embodiments, the system operates in a centralized architecture. In some embodiments, the system operates in a distributed architecture. In some embodiments, the system operates in a federated architecture. In some embodiments, the system operates in a hybrid architecture. In some embodiments, human approval is incorporated as part of the relational context without replacing execution eligibility gating. In some embodiments, execution eligibility varies based on action type. In some embodiments, the execution eligibility gate operates independently of role-based access control systems. In some embodiments, the execution eligibility gate operates independently of centralized policy engines. In some embodiments, execution eligibility is computed using deterministic, non-deterministic, or hybrid techniques without reliance on predefined decision trees or fixed evaluation logic. In some embodiments, gating execution comprises dynamically adjusting execution eligibility in response to changes in relational context occurring after receipt of the proposed action and prior to completion of execution. In some embodiments, the execution eligibility gate enforces execution eligibility across a plurality of execution channels corresponding to different external systems. In some embodiments, execution eligibility is determined based on authority derived jointly from a plurality of principals represented by one or more computational entities.

Described herein is a computer-implemented method, comprising: receiving a proposed action initiated by a computational entity; identifying relational context associated with the computational entity; gating execution of the proposed action by computing execution eligibility based on the relational context using one or more processors, wherein the execution eligibility is not based solely on a static authorization mechanism; and controlling an execution channel to enable execution, modify execution, or prevent execution of the proposed action based on the execution eligibility. In some embodiments, the method further comprises recording each execution enforcement and/or execution outcome for audit purposes. In some embodiments, the method further comprises providing an explanation of a basis for enabling or preventing execution of the proposed action.

Described herein is a computer-implemented method for action execution gating executed at one or more computer processors, the method comprising: receiving a proposed action generated by a computational entity, wherein execution of the proposed action would cause an externally observable state transition in a system distinct from the computational entity; receiving a relational context associated with the computational entity, the relational context comprising one or more dynamically updated relationships between the computational entity and one or more additional computational entities; and gating execution of the proposed action by at least: computing an execution eligibility based at least in part on the relational context, wherein the execution eligibility represents a determination of whether the proposed action is permitted to be executed; and controlling, based on the execution eligibility, an execution channel through which the proposed action would otherwise be executed, wherein controlling the execution channel comprises one or more of: permitting, modifying, and preventing execution of the proposed action In some embodiments, the proposed action comprises an operation, instruction, transaction, communication, or representation pertaining to at least one of the one or more additional computational entities. In some embodiments, the one or more dynamically updated relationships comprise one or more of the following attributes: delegation, representation, coordination, lineage, temporal scope, constraints, revocation, conditional authority, and multi-principal authority. In some embodiments, the relational context is from a Composite Relational Entity (CRE), wherein the CRE represents the one or more dynamically updated relationships between the computational entity and one or more additional computational entities. In some embodiments, computing the execution eligibility is not based solely on a static authorization mechanism. In some embodiments, controlling the execution channel comprises modifying execution of the proposed action based on the execution eligibility. In some embodiments, the method further comprises directly performing the proposed action. In some embodiments, the relational context comprises delegated authority from another computational entity. In some embodiments, the computational entity acts on behalf of a user, organization, or external system. In some embodiments, the proposed action is generated using an internal reasoning or planning process of the computational entity and wherein computing the execution eligibility is independent of the internal reasoning or planning process. In some embodiments, computing the execution eligibility is done jointly across a plurality of computational entities, and wherein computing the execution eligibility is based on each relational context associated with each computational entity of the plurality of computational entities. In some embodiments, computing the execution eligibility further comprises resolving conflicting relational context associated with each computational entity of the plurality of computational entities. In some embodiments, the execution eligibility is subject to a temporal expiration or to one or more contextual conditions. In some embodiments, the relational context comprises lineage information associated with the computational entity. In some embodiments, the method further comprises updating the relational context based on one or more interactions between the computational entity and the one or more additional computational entities. In some embodiments, controlling the execution channel comprises preventing execution of the proposed action, and wherein preventing execution of the proposed action comprises preventing a commitment of a state transition in the system distinct from the computational entity. In some embodiments, computing the execution eligibility is based at least in part on an approval from an individual. In some embodiments, the method further comprises recording the execution eligibility. In some embodiments, the method further comprises generating an explanation of a basis for performing the executive action.

Described herein is a computer-implemented system for action execution gating comprising at least one computer processor and instructions executable by the at least one computer processor to provide an application comprising: a relational context data store configured to store data representing relationships among computation entities, wherein the data is updated dynamically over time; and an eligibility gating engine configured to perform operations comprising: receiving a proposed action initiated by a computational entity; receiving a relational context associated with the computational entity from the relational context data store, the relational context comprising one or more dynamically updated relationships between the computational entity and the one or more additional computational entities; gating execution of the proposed action by: computing an execution eligibility based at least in part on the relational context, wherein the execution eligibility represents a determination of whether the proposed action is permitted to be executed; and controlling, based on the execution eligibility, an execution channel through which the proposed action would otherwise be executed, wherein controlling the execution channel comprises one or more of: permitting, modifying, and preventing execution of the proposed action, wherein the eligibility gating engine is configured to operate in line with an execution channel prior to execution of the proposed action. In some embodiments, the proposed action comprises an operation, instruction, transaction, communication, or representation pertaining to at least one of the one or more additional computational entities. In some embodiments, the one or more dynamically updated relationships comprise one or more of the following attributes: delegation, representation, coordination, lineage, temporal scope, constraints, revocation, conditional authority, and multi-principal authority. In some embodiments, the relational context is from a Composite Relational Entity (CRE), wherein the CRE represents the one or more dynamically updated relationships between the computational entity and one or more additional computational entities. In some embodiments, the eligibility gating engine is not configured to compute the execution eligibility based solely on a static authorization mechanism. In some embodiments, controlling the execution channel comprises modifying execution of the proposed action based on the execution eligibility. In some embodiments, the eligibility gating engine is further configured to directly perform the proposed action. In some embodiments, the relational context comprises delegated authority from another computational entity. In some embodiments, the system further comprises a role-based access control system, wherein the eligibility gating engine is configured to operate independently of the role-based access control system. In some embodiments, the system further comprises a centralized policy engine, wherein the eligibility gating engine is configured to operate independently of the centralized policy engine. In some embodiments, the system further comprises the execution channel, wherein the eligibility gating engine is configured to gate execution of the proposed action at the execution channel. In some embodiments, the system further comprises a plurality of execution channels, wherein the eligibility gating engine is configured to gate execution of the action at one or more of the plurality of execution channels.

Described herein is a non-transitory computer-readable medium storing instructions that, when executed by one or more computer processors, cause the one or more computer processors to perform operations comprising: receiving a proposed action generated by a computational entity, wherein execution of the proposed action would cause an externally observable state transition in a system distinct from the computational entity; receiving a relational context associated with the computational entity, the relational context comprising one or more dynamically updated relationships between the computational entity and one or more additional computational entities; and gating execution of the proposed action by at least: computing an execution eligibility based at least in part on the relational context, wherein the execution eligibility represents a determination of whether the proposed action is permitted to be executed; and controlling, based on the execution eligibility, an execution channel through which the proposed action would otherwise be executed, wherein controlling the execution channel comprises one or more of: permitting, modifying, and preventing execution of the proposed action in a manner that constrains or alters the externally observable state transition.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
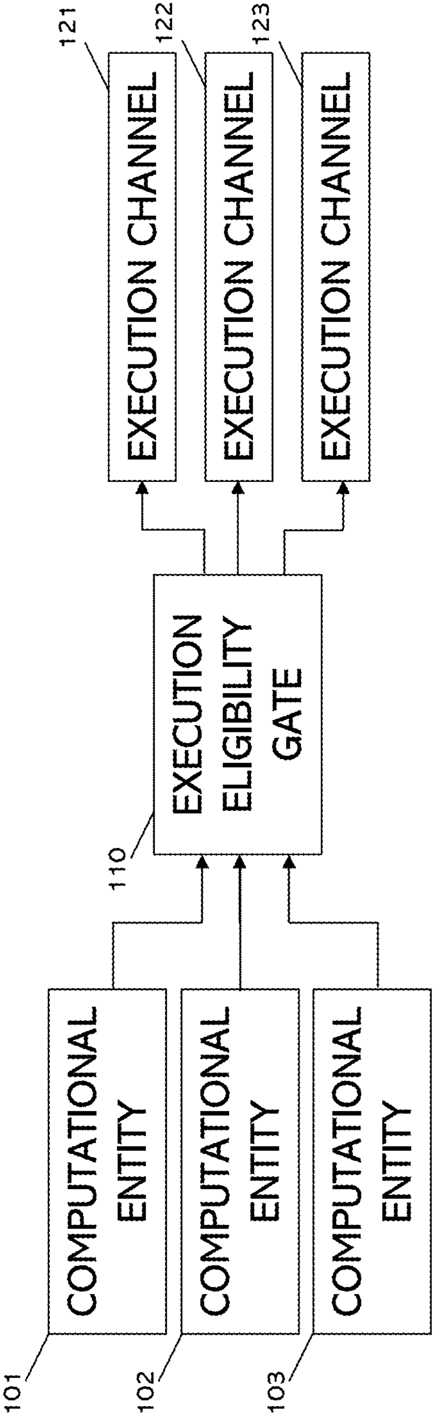
FIG. 1 illustrates an example execution eligibility gate positioned in-line with an execution channel, controlling whether proposed actions may cause externally observable state transitions.

Described herein are systems, methods, and media for action execution gating. In some embodiments, a proposed action is initiated by a computational entity. In some embodiments, the proposed action is related to a computational entity. In some embodiments, the proposed action is initiated in response to a computational entity. In some embodiments, the proposed action is generated by a computational entity. In some embodiments, the proposed action is generated in response to a computational entity.

In some embodiments, the computational entity is a software agent, service, model, workflow, or composite system. In some embodiments, the computational entity operates independently. In some embodiments, the computational entity operates autonomously. In some embodiments, the computational entity operates continuously. In some embodiments, the computational entity operates intermittently or in response to triggering conditions. In some embodiments, the computational entity operates on behalf of one or more users or organizations. In some embodiments, the computational entity operates within a defined execution environment.

In some embodiments, the proposed action comprises an operation, instruction, transaction, communication, or representation intended to produce an externally observable effect on a system, resource, user, or other computational entity. In some embodiments, the proposed action is configured to cause an externally observable state transition in a system. In some embodiments, the externally observable state transition occurs within a system that is distinct from the computational entity generating the proposed action. In some embodiments, the externally observable state transition is detectable, recordable, or verifiable by one or more external systems or observers. In some embodiments, the proposed action comprises initiating a data modification, invoking an external service, issuing a command to a controlled system, transmitting a message, allocating a resource, or committing a transaction within an external system. In some embodiments, the computational entity generates the proposed action in response to receiving input data. In some embodiments, the proposed action comprises an operation, instruction, transaction, communication, or representation pertaining to at least one of one or more additional computational entities.

In some embodiments, the proposed action is generated by a computational entity. In some embodiments, the proposed action is an output of one or more computational processes. In some embodiments, the proposed action is generated based on an internal state, learned parameters, or governance rules associated with the computational entity. In some embodiments, the proposed action is generated as a result of execution of one or more algorithms, models, or workflows. In some embodiments, the proposed action is generated without direct human intervention. In some embodiments, the proposed action is generated autonomously by the computational entity. In some embodiments, the proposed action is generated in response to evaluating input data against one or more objectives. In some embodiments, the proposed action is an action selected from a plurality of possible actions available to the computational entity. In some embodiments, the proposed action is generated based on internal reasoning, planning, or deliberation performed by the computational entity.

In some embodiments, the proposed action is derived from a synthesized output of multiple computational entities. In some embodiments, the synthesized output is generated by combining, aggregating, or reconciling outputs produced from multiple computational entities. For example, the proposed action may be derived from a group result, merged data output, coordinated recommendation, or composite instruction generated through interaction or collaboration among the multiple computational entities.

In some embodiments, a method described herein comprises receiving the proposed action. In some embodiments, the proposed action is received via a network message, signal, or request transmitted by a computational entity. In some embodiments, the proposed action is received through an application programming interface exposed by the engine. In some embodiments, the proposed action is received as part of a workflow or orchestration process executed by a computational entity. In some embodiments, the proposed action is received from a queue, event stream, or messaging system. In some embodiments, the proposed action is received from a database, log, or other persistent data store. In some embodiments, the proposed action is received in response to a user input or an external system event.

In some embodiments, a system described herein comprises an eligibility gating engine, also referred to herein as an execution eligibility gate. In some embodiments, the eligibility gating engine is configured to receive the proposed action. In some embodiments, the eligibility gating engine is configured to receive the proposed action via a network request or message transmitted by a computational entity. In some embodiments, the eligibility gating engine is configured to receive the proposed action through an application programming interface exposed by the system. In some embodiments, the eligibility gating engine is configured to receive the proposed action from a workflow, orchestration process, or automated pipeline executed by one or more computational entities. In some embodiments, the eligibility gating engine is configured to receive the proposed action from a message queue, event stream, or other asynchronous communication channel. In some embodiments, the eligibility gating engine is configured to receive the proposed action from a database, log, or other persistent data source.

In some embodiments, a method described herein comprises receiving a relational context associated with the computational entity. In some embodiments, the relational context comprises one or more relationships between the computational entity and one or more additional computational entities. In some embodiments, the relational context is received via a network request or message transmitted by one or more computational entities. In some embodiments, the relational context is received through an application programming interface exposed by the system or a service.

In some embodiments, the relational context is received from a database, log, registry, or other persistent data store. In some embodiments, the relational context is received from a message queue, event stream, or other asynchronous communication channel. In some embodiments, the relational context is received in response to a user input, system event, or scheduled trigger. In some embodiments, the relational context is received at execution time of the proposed action. In some embodiments, the relational context is received prior to generation of the proposed action. In some embodiments, the relational context is received after generation of the proposed action but prior to execution eligibility evaluation. In some embodiments, the relational context is received concurrently with execution eligibility evaluation. In some embodiments, the relational context is received just-in-time immediately before execution of the proposed action. In some embodiments, the relational context is received periodically and cached for later use during execution eligibility evaluation.

In some embodiments, the relational context comprises one or more dynamically updated relationships between the computational entity and the one or more additional computational entities. In some embodiments, the one or more dynamically updated relationships are updated automatically in response to actions performed by the computational entity or the one or more additional computational entities. In some embodiments, the one or more dynamically updated relationships are updated based on changes in attributes, state, or outputs of the computational entity or the one or more additional computational entities. In some embodiments, the one or more dynamically updated relationships are updated in response to events, notifications, or messages generated by the computational entity or the one or more additional computational entities. In some embodiments, the one or more dynamically updated relationships are updated according to workflow or orchestration processes that track delegation, coordination, or conditional authority. In some embodiments, the one or more dynamically updated relationships are updated periodically or continuously by monitoring interactions between the computational entity and the one or more additional computational entities. For example, a dynamically updated relationship may include a delegation relationship formed when a computational entity is authorized to act on behalf of a user for a specific operation, and this delegation relationship may be removed when the authorization expires. In another example, a dynamically updated relationship may include a coordination relationship that is modified when two computational entities begin collaborating on a workflow, and then updated when the collaboration ends.

In some embodiments, the relational context is sourced from a Composite Relational Entity (CRE). In some embodiments, a CRE is a synthesized computational object representing one or more relationships between two or more source entities. In some embodiments, the two or more source entities are computational entities. In some embodiments, a CRE is an independent representational object that may evolve under governance-weighted update rules. In some embodiments, a CRE is defined by learned aggregation function over feature vectors of each entity the CRE represents. In some embodiments, a CRE represents one or more relationships between two or more computational entities. In some embodiments, the CRE represents one or more dynamically updated relationships between the computational entity and one or more additional computational entities. In some embodiments, a CRE is a synthesized computational object as described in various embodiments in U.S. patent application Ser. No. 19/413,985, entitled AI SYSTEMS AND METHODS FOR ADAPTIVE CROSS-DOMAIN COMPOSITE RELATIONAL SYNTHESIS AND INTEROPERABILITY, filed on Dec. 9, 2025, and listing as inventor Marc Berger, which is hereby incorporated by reference in its entirety.

In some embodiments, the eligibility gating engine is configured to receive the relational context associated with the computational entity. In some embodiments, the eligibility gating engine is configured to receive the relational context from a relational context data store, database, log, or other persistent data source. In some embodiments, the eligibility gating engine is configured to update or refresh the relational context in real time or near real time based on changes in computational entity relationships, actions, or system events.

In some embodiments, a system described herein comprises a relational context data store. In some embodiments, the relational context data store is configured to store relational context data representing relationships among computational entities. In some embodiments, the data representing relationships among computational entities comprises the relational context associated with the computational entity.

In some embodiments, the relational context data store is configured to store dynamically updated relationships, including delegation, representation, coordination, conditional authority, multi-principal authority, temporal scope, or lineage relationships. In some embodiments, the relational context data store is configured to provide relational context data to the eligibility gating engine upon request or automatically in response to an event, change in state, or scheduled trigger. For example, the relational context data store may store a delegation relationship indicating that a computational entity is authorized to act on behalf of a user for a particular operation, and this relationship may be updated or removed when the authorization changes or expires.

In some embodiments, the relational context or relational context data comprises lineage information associated with a computational entity. In some embodiments, lineage information tracks outputs or data generated by a computational entity. The relational context may reflect the origin, transformation, or derivation of one or more outputs from a computational entity. In some embodiments, lineage information indicates that a proposed action depends on outputs produced by one or more prior actions of the computational entity. The lineage anchor may reflect whether the prior outputs exist, are valid, or satisfy a defined criteria. In some embodiments, the lineage information is dynamically updated as outputs are modified, merged, or transformed, and the relational context may be correspondingly updated to reflect these changes. For example, if a computational entity modifies a previously generated output that another entity relies on, the relational context for the other entity may be updated.

In some embodiments, the lineage information tracks the history of a computational entity. This may include changes to the configuration, capabilities, or authority of the computational entity overtime. For example, a computational entity that has transitioned through multiple roles or undergone updates to its permissions may have those changes reflected in lineage information, In some embodiments, the one or more dynamically updated relationships comprise one or more of the following attributes: delegation, representation, coordination, lineage, temporal scope, constraints, revocation, conditional authority, and multi-principal authority.

In some embodiments, the one or more dynamically updated relationships comprise a delegation attribute. For example, a delegation relationship may be formed when a computational entity is authorized to act on behalf of a user for a specific operation, and this relationship may be removed when the authorization expires.

In some embodiments, the one or more dynamically updated relationships comprise a representation attribute. For example, a representation relationship may be formed when a computational entity acts as a proxy for another computational entity or organization, and this relationship may be updated when the proxy status changes.

In some embodiments, the one or more dynamically updated relationships comprise a coordination attribute. For example, a coordination relationship may be formed when two computational entities collaborate on a workflow, and this relationship may be updated when the collaboration is modified or completed.

In some embodiments, the one or more dynamically updated relationships comprise a lineage attribute. For example, a lineage relationship may be formed to track outputs generated by one or more computational entities, and this relationship may be updated when the outputs are modified, merged, or otherwise transformed.

In some embodiments, the one or more dynamically updated relationships comprise a temporal scope attribute. For example, a temporal scope relationship may be formed to indicate that a computational entity's authority or role is valid only for a defined period, and this relationship may be updated as the period starts, ends, or is extended.

In some embodiments, the one or more dynamically updated relationships comprise a constraints attribute. For example, a constraints relationship may be formed to restrict a computational entity's ability to execute actions under certain conditions, and this relationship may be updated when the conditions change.

In some embodiments, the one or more dynamically updated relationships comprise a revocation attribute. For example, a revocation relationship may be formed when a previously granted authority to a computational entity is rescinded, and this relationship may be updated if the authority is reinstated.

In some embodiments, the one or more dynamically updated relationships comprise a conditional authority attribute. For example, a conditional authority relationship may be formed to allow a computational entity to perform an action only when certain conditions are satisfied, and this relationship may be updated as the conditions are met or no longer satisfied.

In some embodiments, the one or more dynamically updated relationships comprise a multi-principal authority attribute. For example, a multi-principal authority relationship may be formed when multiple users or organizations delegate permissions to a computational entity, and this relationship may be updated as additional principals grant or revoke authority.

In some embodiments, the relational context of a computational entity is dynamically updated based at least in part on one or more interactions between the computational entity and one or more additional computational entities. For example, when a computational entity completes an action that affects, depends on, or is coordinated with actions of another computational entity, the relational context may be updated to reflect the resulting change in relationships, dependencies, or status. In some embodiments, updating the relational context comprises modifying delegation, coordination, conditional authority, or multi-principal authority relationships to account for the outcomes of the one or more interactions. In some embodiments, the eligibility gating engine is configured to receive the updated relational context.

In some embodiments, a method described herein comprises gating execution of a proposed action. In some embodiments, gating execution of a proposed action comprises computing an execution eligibility. In some embodiments, computing an execution eligibility is based at least in part on relational context data or relational context. In some embodiments, the proposed action is related to or initiated by a computational entity and the relational context is associated with the computational entity. In some embodiments, computing the execution eligibility comprises evaluating the proposed action against one or more attributes of the relational context associated with the computational entity. In some embodiments, computing the execution eligibility comprises determining whether one or more dynamically updated relationships satisfy conditions associated with the execution of the proposed action. In some embodiments, computing the execution eligibility comprises applying one or more rules, policies, logical expressions, decision trees, machine learning models, or combinations thereof to the relational context data. In some embodiments, computing the execution eligibility is not based solely on a static authorization mechanism.

In some embodiments, computing the execution eligibility comprises evaluating delegation, representation, coordination, temporal scope, constraints, revocation status, conditional authority, multi-principal authority, or a combination thereof. For example, execution eligibility may be computed by determining that a computational entity possesses a valid delegation relationships with an unexpired temporal scope for the proposed action. In some embodiments, computing the execution eligibility comprises applying one or more rules, policies, models, logical expressions, or decision procedures to the relational context data. For example, execution eligibility may be computed by applying a policy that evaluates whether a delegation relationship in the relational context data authorizes the computational entity to perform the proposed action within a defined temporal scope. In some embodiments, computing the execution eligibility comprises producing an eligibility outcome indicating whether execution of the proposed action is permitted, restricted, deferred, or denied.

In some embodiments, the eligibility gating engine is configured to gate execution of a proposed action by computing an execution eligibility based at least in part on relational context. In some embodiments, the eligibility gating engine computes the execution eligibility by evaluating the proposed action against one or more attributes of the relational context data. In some embodiments, the eligibility gating engine is not configured to compute the execution eligibility based solely on a static authorization mechanism.

In some embodiments, the eligibility gating engine is configured to compute an execution eligibility by detecting a revocation attribute within the relational context data and deny execution of the proposed action in response to determining that a previously granted authority has been revoked. In some embodiments, the eligibility gating engine is configured to compute an execution eligibility using one or more rules, policies, logical expressions, decision trees, machine learning models, or combinations thereof to the relational context data to compute the execution eligibility.

In some embodiments, the eligibility gating engine is configured to compute an execution eligibility by evaluating one or more coordination relationships to determine whether execution of the proposed action is dependent on completion, approval, or synchronization with actions performed by one or more additional computational entities.

In some embodiments, the eligibility gating engine is configured to compute an execution eligibility by accounting for multi-principal authority relationships when computing execution eligibility. For example, the eligibility gating engine may determine that execution of the proposed action is permitted only when authorization from a threshold number of additional computational entities has been received.

In some embodiments, the eligibility gating engine is configured to compute an execution eligibility by evaluating representation relationships to determine whether the computational entity is acting in an authorized proxy capacity for another computational entity, user, or organization with respect to the proposed action.

In some embodiments, the execution eligibility is subject to a temporal expiration or one or more contextual conditions. The temporal expiration can define a period during which a computational entity is authorized to perform a proposed action. In some embodiments, execution eligibility is automatically denied upon the expiration of the period. One or more contextual conditions may include, for example, the state of one or more computational entities, the completion of prerequisite actions, the availability of required resources, or compliance with defined operational criteria. In some embodiments, the execution eligibility is dynamically updated as the contextual conditions change. For example, execution eligibility may be dynamically updated when a computational entity is initially permitted to perform a proposed action only if a prerequisite task performed by another computational entity is completed. If the prerequisite task is later completed, the execution eligibility may be updated to permit execution of the proposed action. Conversely, if the prerequisite task is invalidated or the state of a required resource changes, the execution eligibility may be updated such that execution is prevented. In some embodiments, the execution eligibility gating engine is configured to monitor the temporal expiration and contextual conditions in real time. In some embodiments, the execution eligibility is recomputed when a temporal expiration is changed (e.g., extended or shortened), or when one or more contextual conditions are modified.

In some embodiments, computing the execution eligibility is based at least in part on authority derived jointly from a plurality of principals represented by one or more computational entities. In some embodiments, the plurality of principals comprise users, organizations, or other computational entities that each delegate authority to the computational entity proposing the action. For example, the execution eligibility for a proposed action may be satisfied only when a threshold number of principals have granted authorization. In some embodiments, evaluation of the combined authority from the plurality of principals is done in real time.

In some embodiments, computing the execution eligibility is performed during execution of the proposed action. In some embodiments, execution eligibility is computed continuously or at one or more checkpoints while the proposed action is being executed. For example, execution of the proposed action may be permitted to continue only after computation of the execution eligibility.

In some embodiments, execution eligibility is dynamically adjusted in response to changes in relational context occurring after receipt of the proposed action and prior to completion of execution. In some embodiments, dynamic adjustments comprise monitoring relational context attributes, approvals, temporal conditions, or constraint relationships in real time and updating the execution eligibility as those attributes change. For example, if a required delegation relationship is revoked, a temporal scope expires, or a conditional authority is no longer satisfied while the proposed action is in progress, execution eligibility may be updated to prevent further execution.

In some embodiments, computing the execution eligibility is performed after execution of the proposed action to enable post-execution enforcement. In some embodiments, post-execution enforcement comprises evaluating whether execution of the proposed action complied with one or more conditions associated with the relational context at the time of execution. For example, if post-execution computation determines that execution eligibility was not satisfied, the system may initiate a remedial action, generate an alert or notification, update relational context data, or record a violation in a log or history. Any post execution computation or recording does not permit execution and does not replace execution eligibility enforcement, which occurs prior to any externally observable state transition.

In some embodiments, computing the execution eligibility is based at least in part on an approval from an individual. In some embodiments, the approval is provided by a user, administrator, or other authorized individual associated with the computational entity. For example, execution eligibility for a proposed action may be computed as permitted only after an individual provides an explicit approval, and may remain restricted or denied until the approval is received, validated, or recorded in the relational context data.

In some embodiments, computing the execution eligibility is performed using deterministic techniques. In some embodiments, deterministic techniques comprise application of rules, policies, or logical expressions that produce predictable outcomes given the same relational context. In some embodiments, computing the execution eligibility is performed using non-deterministic, or hybrid techniques without reliance on predefined decision trees or fixed evaluation logic. In some embodiments, non-deterministic techniques comprise probabilistic models, machine learning algorithms, or other approaches that may produce different outcomes based on prior observations, learned patterns, or stochastic processes. In these embodiments, the resulting execution eligibility is deterministically enforced upon executive action or controlling the execution channel. In some embodiments, hybrid techniques combine deterministic rules with non-deterministic models to compute execution eligibility. For example, a hybrid approach may first apply rule-based checks for delegation, temporal scope, or constraints, and then apply a machine learning model to evaluate conditional authority or coordination requirements, producing an execution eligibility outcome that reflects both fixed policies and adaptive context. Non-deterministic techniques may compute the execution eligibility; however, the executive action or control of the execution channel is enforced deterministically.

In some embodiments, the execution eligibility is recorded. In some embodiments, the execution eligibility is stored on a non-transitory computer-readable medium. In some embodiments, the execution eligibility is recorded as part of a log or history associated with the computational entity or the proposed action. For example, the log or history may include information indicating how the execution eligibility was computed, including one or more relational context attributes, rules, policies, or approvals evaluated in determining the execution eligibility. In some embodiments, the recorded execution eligibility and associated log or history may be used for auditing, compliance, troubleshooting, or subsequent recomputation of execution eligibility.

In some embodiments, methods described herein comprises performing an executive action based on an execution eligibility. In some embodiments, the executive action comprises one or more of: permitting, modifying, and preventing execution of the proposed action. In some embodiments, the executive action comprises permitting execution of the proposed action. In some embodiments, the executive action comprises modifying the proposed action. In some embodiments, the executive action comprises preventing the proposed action. In some embodiments, the executive action comprises controlling an execution channel through which the proposed action would otherwise be executed. In some embodiments, controlling the execution channel comprises one or more of: permitting, modifying, and preventing execution of the proposed action.

In some embodiments, performing the executive action comprises permitting execution of the proposed action. In some embodiments, execution of the proposed action is permitted when the execution eligibility reflects that the proposed action satisfies one or more conditions associated with the relational context of the computational entity. For example, the executive action may permit execution when the computational entity is associated with a valid delegation relationship, an applicable representation relationship, and an unexpired temporal scope, and when no revocation or constraint relationship applies. In some embodiments, permitting execution comprises generating an execution signal, instruction, or token that permits an execution channel, execution engine, application runtime, or workflow system to carry out the proposed action. In some embodiments, permitting execution further comprises initiating execution of the proposed action without additional intervention. In some embodiments, permitting execution comprises permitting the proposed action to cause a state transition within a system, application, or execution environment. For example, permitting execution may permit a proposed action to modify stored data, update system state, initiate a workflow, transmit a message, allocate a resource, or invoke an external service. In some embodiments, the execution eligibility governs whether the proposed action is permitted to transition a system from a first state to a second state. In some embodiments, permitting execution comprises controlling an execution channel through which the proposed action would otherwise be carried out. For example, the executive action may enable, open, or activate an execution channel associated with an application interface, service endpoint, workflow engine, or command processor, thereby allowing the proposed action to be executed through the execution channel.

In some embodiments, performing the executive action comprises preventing execution of the proposed action. In some embodiments, execution of the proposed action is prevented when the execution eligibility reflects that one or more conditions associated with the relational context are not satisfied. For example, execution may be prevented when a required delegation relationship is absent, a temporal scope has expired, a revocation relationship is present, a constraint relationship prohibits the proposed action, or a conditional authority relationship has not been satisfied. In some embodiments, preventing execution comprises preventing the proposed action from causing a state transition. For example, preventing execution may maintain a current system state by blocking modification of data, preventing invocation of a service, inhibiting transmission of a message, or canceling a workflow step that would otherwise alter system state. In some embodiments, the execution eligibility governs whether a proposed state transition associated with the proposed action is disallowed. In some embodiments, preventing execution comprises controlling an execution channel through which the proposed action would otherwise be carried out. For example, the executive action may disable, block, suspend, or close an execution channel associated with the proposed action, thereby preventing the proposed action from being executed through the execution channel. In some embodiments, preventing execution further comprises generating a denial signal, error response, or notification indicating that the proposed action is not permitted to proceed through the execution channel.

In some embodiments, performing the executive action comprises modifying execution of the proposed action. In some embodiments, modifying execution of the proposed action comprises altering one or more parameters, scopes, privileges, or operational characteristics of the proposed action based on the execution eligibility. For example, the proposed action may be modified to limit access to a subset of resources, reduce an authorization level, restrict a duration of execution, or require additional approval or coordination prior to completion. In some embodiments, modification of execution does not permit a prohibited action to proceed but instead constrains execution to a subset of effects that satisfy execution eligibility conditions.

In some embodiments, modifying execution of the proposed action comprises governing how the proposed action is permitted to cause a state transition. For example, modifying execution may permit a partial state transition, a conditional state transition, or a constrained state transition, while preventing other state changes that would otherwise result from full execution of the proposed action. In some embodiments, modifying execution enables the proposed action to transition the system to a modified or intermediate state that complies with the relational context.

In some embodiments, modifying execution comprises controlling an execution channel through which the proposed action would otherwise be carried out. For example, the executive action may route the proposed action through an alternative execution channel, apply additional constraints or transformations within the execution channel, throttle execution, or defer execution until one or more conditions are satisfied. In some embodiments, modifying execution enables controlled execution through the execution channel while ensuring that the resulting state transitions remain consistent with the execution eligibility.

In some embodiments, the eligibility gating engine described herein is configured to perform an executive action based on the execution eligibility. In some embodiments, the executive action comprises one or more of: permitting, modifying, and preventing execution of the proposed action. In some embodiments, the executive action comprises permitting execution of the proposed action. In some embodiments, the executive action comprises modifying the proposed action. In some embodiments, the executive action comprises preventing the proposed action. In some embodiments, the executive action comprises controlling an execution channel through which the proposed action would otherwise be executed. In some embodiments, controlling the execution channel comprises one or more of: permitting, modifying, and preventing execution of the proposed action.

In some embodiments, a system described herein comprises an execution channel and the eligibility gating engine is configured to gate execution of the proposed action at the execution channel. In some embodiments, a system described herein comprises a plurality of execution channels, and the eligibility gating engine is configured to gate execution of the action at one or more the plurality of execution channels. For example, different execution channels may correspond to different interfaces, service endpoints, or workflow stages, and the eligibility gating engine may be configured to selectively enable or disable execution at a particular execution channel based on the relational context and the execution eligibility.

In some embodiments, performing the executive action further comprises generating an explanation of a basis for performing the executive action. In some embodiments, the explanation identifies whether the executive action permitted, prevented, or modified execution of the proposed action and specifies one or more factors used in determining the execution eligibility that led to the executive action. For example, the explanation may indicate that execution was permitted based on satisfaction of a delegation relationship and an unexpired temporal scope. In another example, the explanation may indicate that execution was prevented due to the current presence of a revocation relationship. In some embodiments, the system is configured to record the basis for each execution enforcement and/or execution outcome, including relevant relational context, applied constraints, and timing information. In some embodiments, the explanation is generated for presentation to a user, inclusion in a log or history, or transmission to another entity or system. In some embodiments, a system described herein comprises an interface configured to present the explanation. In some embodiments, the eligibility gating engine described herein is configured to present the explanation.

In some embodiments, a method described herein comprises directly performing the proposed action. In some embodiments, directly performing the proposed action is based on the execution eligibility. In some embodiments, directly performing the proposed action comprises executing the proposed action by the same system, service, or execution environment that computes the execution eligibility and performs the executive action. For example, when the execution eligibility reflects that execution of the proposed action is permitted, the method may comprise directly invoking the proposed action to cause a corresponding state transition without routing the proposed action to an external execution system.

In some embodiments, directly performing the proposed action comprises performing the proposed action through a controlled execution channel. For example, the method may comprise executing the proposed action within a managed runtime, transaction boundary, or execution context that enforces one or more constraints derived from the relational context. In some embodiments, directly performing the proposed action comprises executing a modified version of the proposed action, including partial execution, constrained execution, or execution subject to additional conditions.

In some embodiments, the eligibility gating engine is configured to directly perform the proposed action. In some embodiments, the eligibility gating engine is configured to both compute the execution eligibility and execute the proposed action when the execution eligibility reflects that execution is permitted. In some embodiments, the eligibility gating engine is configured to directly perform the proposed action through a controlled execution channel. In some embodiments, the eligibility gating engine comprises the execution channel through which the proposed action would be carried out. In some embodiments, the eligibility gating engine directly governs whether the proposed action is executed, modified, or prevented. In some embodiments, the eligibility gating engine is configured to enforce execution eligibility autonomously. In some embodiments, the eligibility gating engine is integrated within an execution control infrastructure. In some embodiments, the execution control infrastructure comprises one or more runtime environments, workflow engines, access control systems, or transaction managers through which the proposed action is carried out under the governance of the eligibility gating engine.

In some embodiments, the execution eligibility engine is configured to operate in-line with one or more execution channels through which the proposed action would otherwise be carried out. In some embodiments, the execution eligibility engine is configured to gate execution of the proposed action at or near the execution time of the proposed action. In some embodiments, the execution eligibility engine is configured to operate in-line with the execution channel such that failure to satisfy execution eligibility prevents the proposed action from occurring, rather than merely generating advisory or audit information. For example, a computational entity may submit a proposed action to modify a data record in a database through an execution channel, the execution eligibility engine may directly prevent the proposed action from modifying the data record at the execution channel, ensuring the database remains unchanged.

In some embodiments, the eligibility gating engine is configured to evaluate execution eligibility of a proposed action independently of any internal reasoning, parameters, or training of a computational entity proposing the action. In some embodiments, the execution eligibility is determined without reference to probabilistic outputs, learned weights, or internal decision-making processes of the proposing computational entity.

In some embodiments, methods, systems, or media described herein comprise computing execution eligibility jointly across a plurality of computational entities. For example, the eligibility gating engine may evaluate a proposed action based on relational context associated with multiple computational entities, including delegation, coordination, representation, temporal scope, constraints, revocation, conditional authority, or multi-principal authority relationships. In some embodiments, when execution eligibility determinations for multiple computational entities are inconsistent or conflicting, such conflicts are resolved using one or more rules based on precedence, lineage, priority, or hierarchical relationships among the computational entities. For example, a proposed action may be permitted, modified, or prevented based on one or more rules that prioritize a primary entity's execution eligibility, merges eligibility outcomes according to defined policies, or follows a lineage-based order of authority among the entities.

In some embodiments, a computational entity is configured to regenerate. In some embodiments, the computational entity is configured to restart. In some embodiments, when the computational entity is regenerated it is regenerated with a persistent identifier, a lineage anchor, and/or one or more updated parameters. In some embodiments, the calculated execution eligibility for a proposed action from a computational entity persist independent of regeneration or restart of the computational entity. In some embodiments, execution eligibility is maintained across multiple regenerations or restarts. In some embodiments, execution eligibility is maintained even if the computational entity operates under different execution contexts, platforms, or runtime environments following regeneration.

In some embodiments, a system described herein comprises a role-based access control system. In some embodiments, the eligibility gating engine is configured to operate independently of the role-based access control system.

In some embodiments, a system described herein comprises a centralized policy engine. In some embodiments, the centralized policy engine is configured to manage one or more policies governing execution of actions within the system. In some embodiments, the eligibility gating engine is configured to operate independently of the centralized policy engine. For example, the eligibility gating engine may compute execution eligibility based on relational context data, locally applied rules, or previously obtained policy information, without involving the centralized policy engine. In some embodiments, the centralized policy engine and the eligibility gating engine operate asynchronously.

In some embodiments, a system described herein comprises one or more components configured to synthesize authority, evaluate identity, apply policy, or record post-execution provenance. In some embodiments, the eligibility gating engine is architecturally distinct from these components. In some embodiments, the one or more components are configured to operate before, during, or after eligibility gating by the eligibility gating engine. In some embodiments, the eligibility gating engine is configured to receive one or more inputs from the one or more components. For example, a component may synthesize an authority for a computational entity and this authority may be used by the eligibility gating engine to gate a proposed action from the computational entity. The post execution recording is non-authoritative and cannot retroactively, permit, validate, or authorize an execution that failed execution eligibility.

In some embodiments, a system described herein operates in a centralized architecture. In some embodiments, computing the execution eligibility, storing relational context, performing executive actions, or generating explanations is performed by one or more centralized components. For example, a centralized eligibility gating engine may receive relational context data from multiple computational entities and compute execution eligibility for a proposed action across the system.

In some embodiments, a system described herein operates in a distributed architecture. In some embodiments, computing the execution eligibility, storing relational context, performing executive actions, or generating explanations is performed by multiple distributed components operating across different nodes or computational entities. For example, local gating engines may compute execution eligibility based on locally available relational context data while coordinating with other distributed components as needed.

In some embodiments, a system described herein operates in a federated architecture. In some embodiments, computing the execution eligibility, storing relational context, performing executive actions, or generating explanations is performed independently by multiple autonomous systems, organizations, or domains, each maintaining its own relational context and policies. For example, execution eligibility for a proposed action may be computed based on a combination of determinations provided by multiple federated systems.

In some embodiments, a system described herein operates in a hybrid architecture. In some embodiments, computing the execution eligibility, storing relational context, performing executive actions, or generating explanations is performed using a combination of centralized, distributed, and federated components. For example, a centralized component may distribute policies, while distributed or federated components compute execution eligibility locally and perform executive actions based on local relational context.

FIG. 1 illustrates an execution eligibility gate 110 operating as an in-line control component positioned between one or more computational entities 101-103 and execution channels 121-123 that cause externally observable state transitions. Proposed actions generated by the one or more computational entities 101-105 must pass through the execution eligibility gate 110 prior to execution. The execution eligibility gate 110 computes execution eligibility for the proposed action using relational context, and execution is permitted only when eligibility is satisfied. The execution eligibility gate 110 thereby functions as a runtime chokepoint governing whether execution may occur at all.

Figure 2:
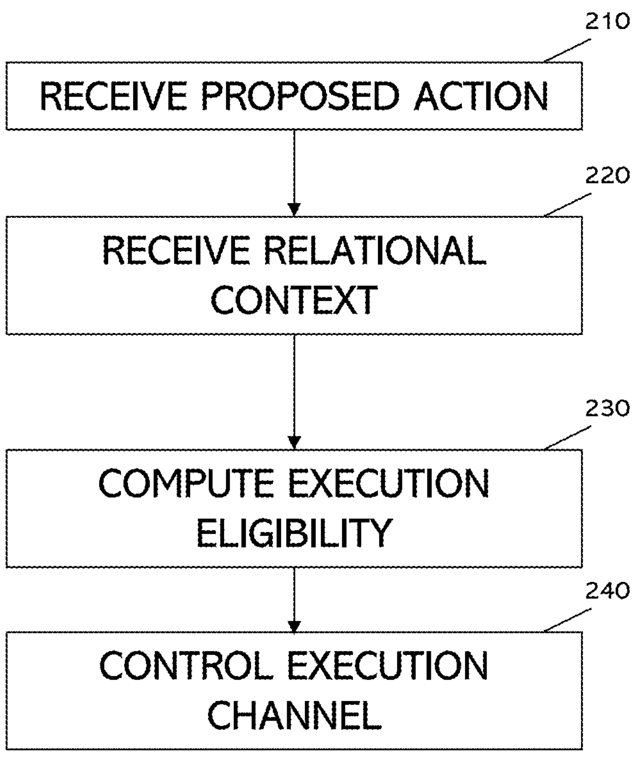
FIG. 2 illustrates an example method for gating execution of a proposed action based on relational context evaluated at execution time.

FIG. 2 illustrates a method in which a proposed action is received 210, relational context is received 220, execution eligibility is computed 230 at execution time of the proposed action, and an execution channel is controlled 240 such that execution of the proposed action is permitted, modified, or prevented. Execution eligibility operates as a condition precedent to execution rather than as an advisory or approval outcome.

Figure 3:
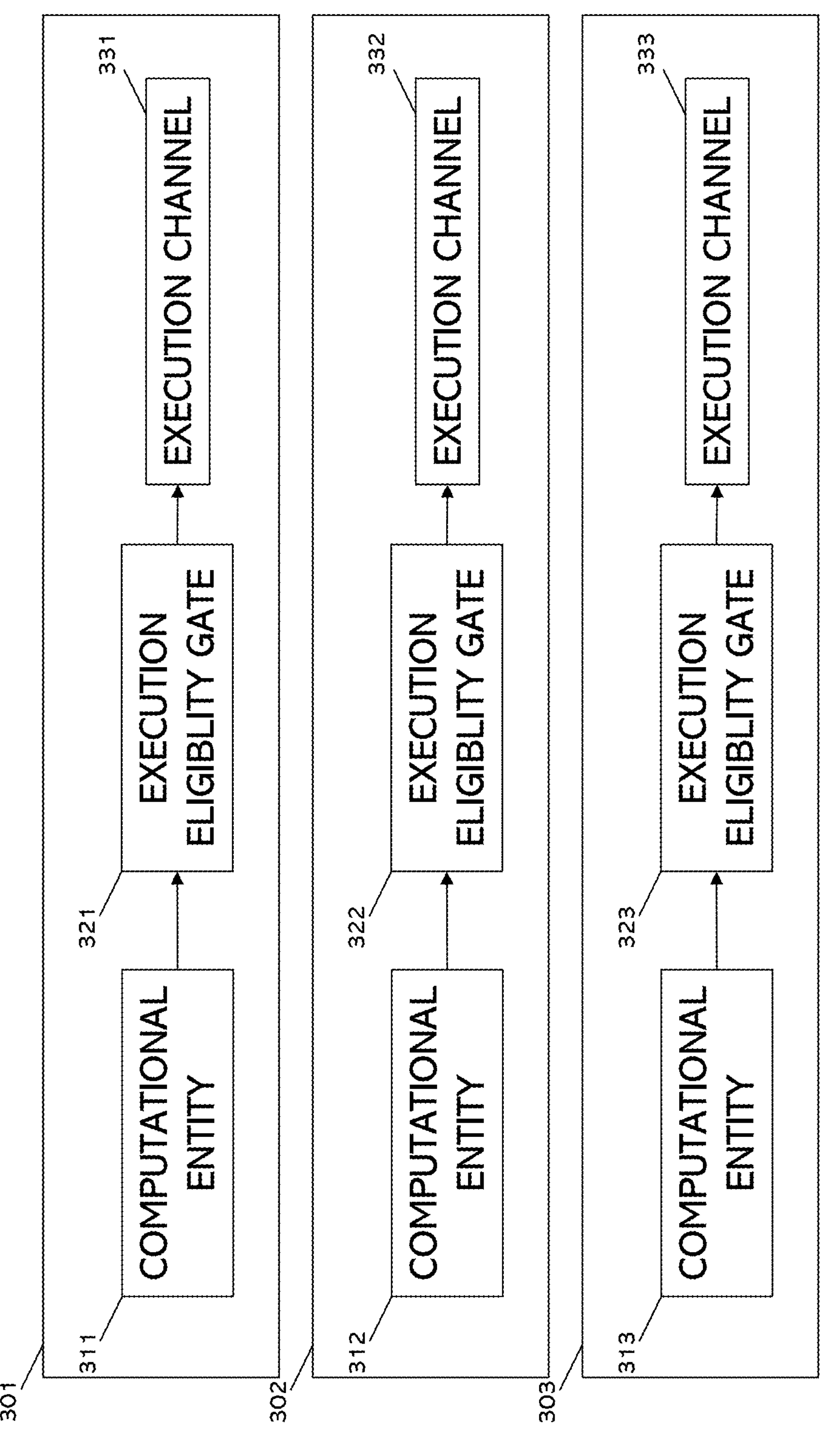
FIG. 3 illustrates an example distributed or federated environment in which execution eligibility is enforced locally at execution channels across multiple systems.

FIG. 3 illustrates distributed and federated embodiments in which execution eligibility gating is independently enforced at local execution channels 331-333 across multiple systems 301-303. Each execution eligibility gate 321-323 independently prevents execution at its respective execution channel 331-333 absent satisfaction of execution eligibility, without reliance on centralized authorization or policy enforcement. Execution eligibility evaluation and enforcement occur locally within each system, without requiring coordination, consensus, or prior approval from other systems. In some embodiments, each gate 321-323 is configured to apply a different eligibility criteria. In some embodiments, execution eligibility is determined based on locally available relational context information and this information may differ between systems.

Figure 4:
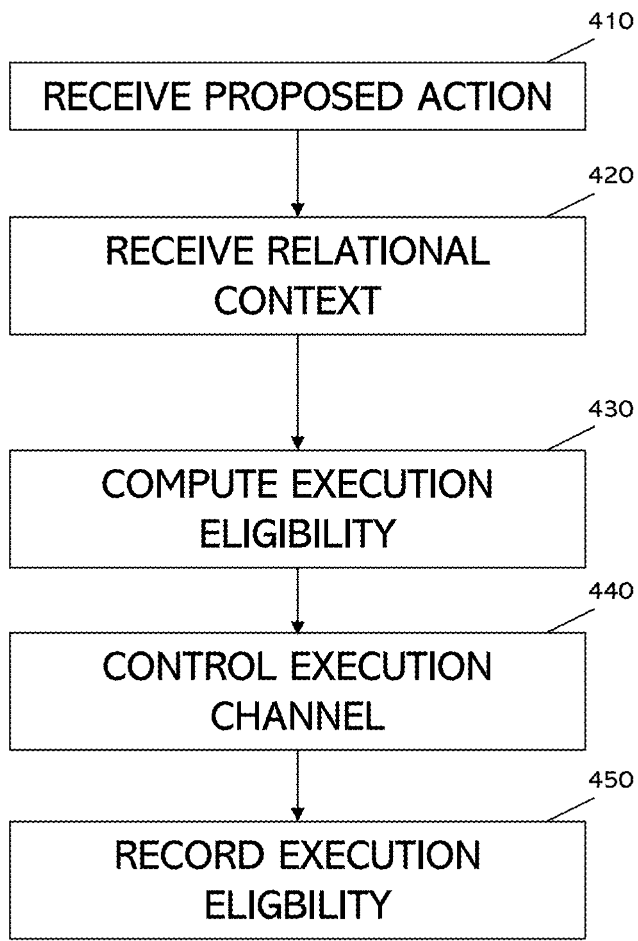
FIG. 4 illustrates an example of post-execution recording of execution eligibility determinations, separate from execution authorization or enforcement.

FIG. 4 illustrates an example of post-execution recording of execution eligibility determinations for audit, inspection, or verification. After the execution eligibility is computed 430 and the execution channel is controlled 440, the execution eligibility is recorded. In some embodiments, the recorded information also includes contextual metadata associated with the execution, or identifiers of the execution channel. The recorded information may be in some embodiments stored remotely and accessible over a network. In some embodiments, the recorded information is retained independently of the execution channel and may be accessed by systems or users other than the executing system. In this example, the recorded information does not authorize execution and does not permit execution absent satisfaction of execution eligibility at runtime.

Figure 5:
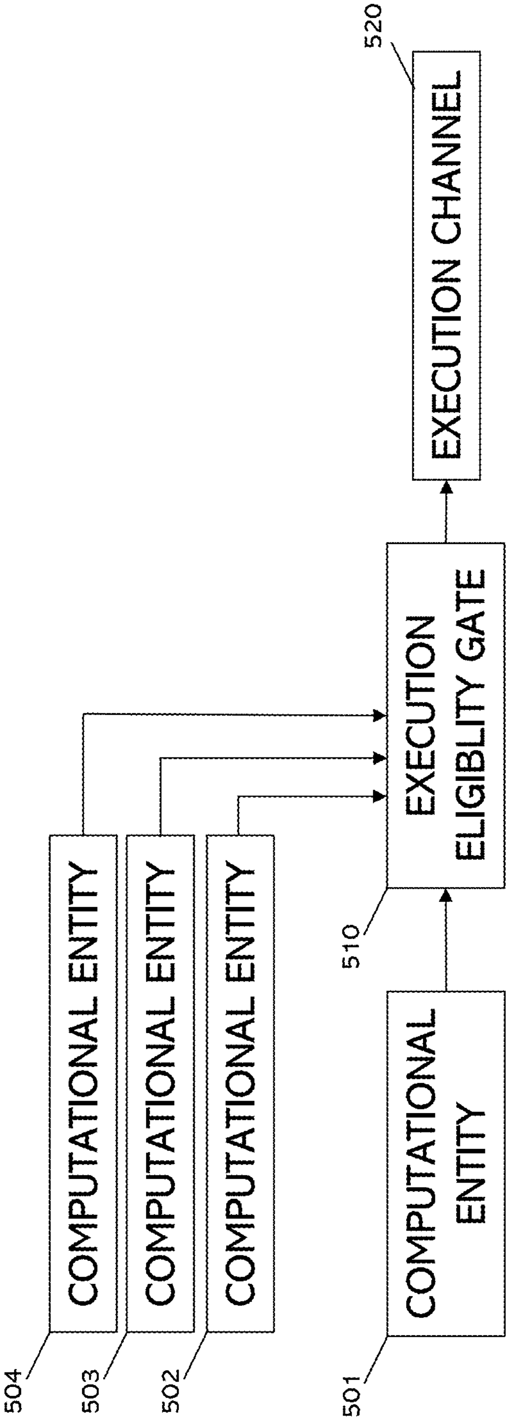
FIG. 5 illustrates an example resolution of conflicting execution eligibility signals derived from relational context associated with multiple computational entities.

FIG. 5 illustrates resolution of conflicting execution eligibility signals derived from relational context associated with multiple computational entities 502-504. Conflicts are resolved prior to execution using precedence, lineage, or coordination rules, ensuring that execution does not occur unless eligibility is satisfied. An initiating computational entity 501 initiates a proposed action. An execution eligibility gate 510 evaluates the execution eligibility of the proposed action based on relational context associated with the multiple computational entities 502-504. This relational context is representative of the relationship between the initiating computational entity 501 and the other computational entities 502-504, and may include, for example, trust relationships, hierarchical relationships, delegation relationships, or other associations. Upon conflict between the relational context associated with the multiple computational entities 502-504, such as differing or inconsistent hierarchical relationships, the execution eligibility gate 510 is configured to resolve the conflict prior to controlling an execution channel 520. The execution eligibility gate 510 may be configured to resolve the conflict using one or more precedence, lineage, or coordination rules. Execution is prevented while conflicts remain unresolved. Once the conflict is resolved and the execution eligibility computed, the execution eligibility gate 510 is configured to control the execution channel 520 based on the computed execution eligibility.

Figure 6:
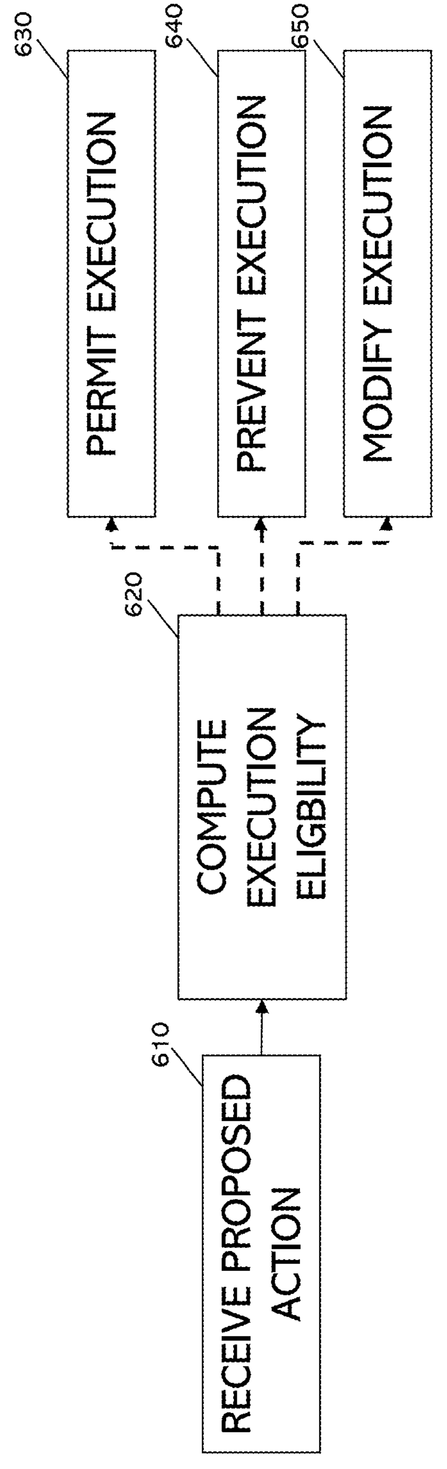
FIG. 6 illustrates example execution outcomes resulting from execution eligibility enforcement.

FIG. 6 illustrates enforcement outcomes resulting from execution eligibility gating. First a proposed action is received 610, and then execution eligibility is computed 620. Following the computation of execution eligibility, execution is permitted 630 when eligibility is satisfied, such that the action proceeds unaltered. Execution is prevented 640 when eligibility is not satisfied, blocking the action prior to execution. Execution may also be modified 650, for example, by reducing the scope of the action, adjusting parameters, delaying execution, or otherwise altering the action based on eligibility. In some embodiments, other outcomes may be possible, provided execution eligibility is enforced prior to execution.

Figure 7:
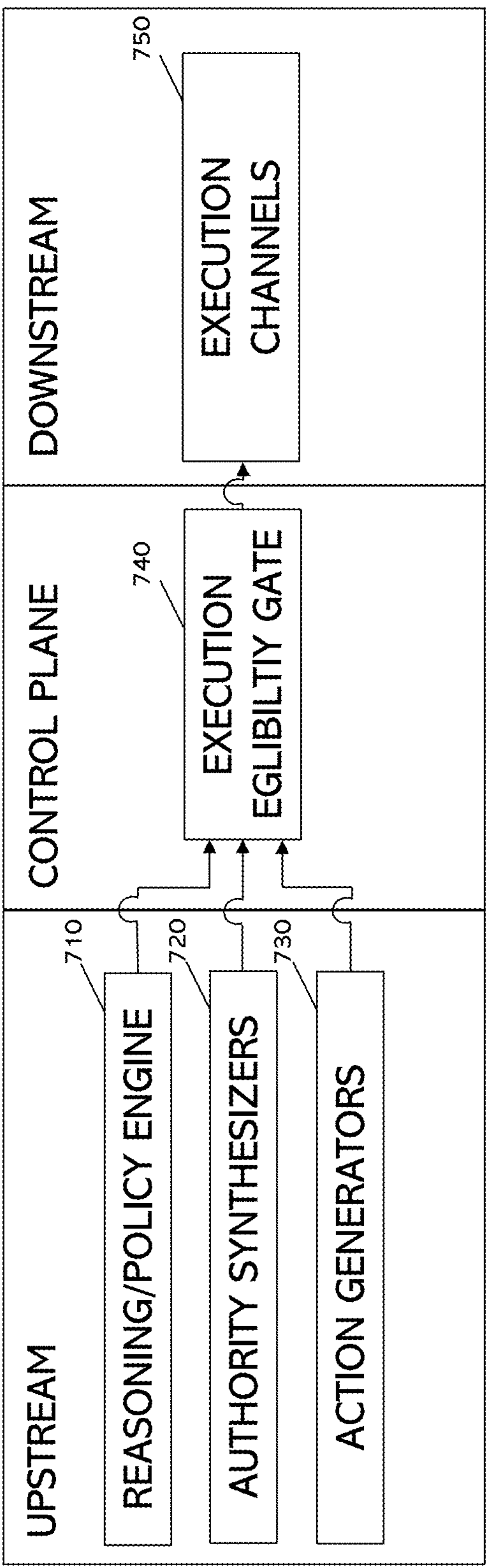
FIG. 7 illustrates an example of architectural separation between execution eligibility gating and other system components that generate actions, authority, or policy.

FIG. 7 illustrates architectural separation between the execution eligibility gate 740 and components that generate actions, synthesize authority, perform reasoning, or apply policy, including separation between upstream components, a control plane, and downstream components. The execution eligibility gate 740 operates as a control plane, does not generate actions or authority, and operates solely to govern execution at execution channels 750. In this example, upstream action generators generate actions which are received by the execution eligibility gate 740. The execution eligibility gate 740 controls execution of the proposed actions at downstream execution channels 750. A reasoning/policy engine 710 is configured to evaluate rules, constraints, or policies associated with proposed actions and to provide eligibility-related context to the execution eligibility gate 740. An authority synthesizer 720 is configured to generate authority or credential information that may be used by the execution eligibility gate 740 to determine whether execution is permitted, prevented, or modified. In some embodiments, the reasoning/policy engine 710 and the authority synthesizer 720 operate independently of the execution eligibility gate 740, such that the gate enforces execution eligibility based solely on locally available information and does not delegate control to the other components.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

The terms "entity" or "entities" as used herein can be any natural person, artificial person, organization, or construct. In some embodiments, an entity can include an individual, a corporation, a partnership, a trust, a governmental body, a non-governmental organization, a foundation, an academic institution, or any other public or private institution.

The term "feedback" as used herein refers to any data, signal, information, or indicator that reflects, represents or is derived from an outcome, response, interaction, or performance. In some embodiments, feedback can include explicit inputs, such as a rating provided directly by an entity. In some embodiments, feedback can include implicit or observed data derived from behaviors, transactions, communications, environmental conditions, or sensor outputs. Feedback may be qualitative or quantitative. In some embodiments, feedback can be automatically generated by a computational process, algorithm, or system. In some embodiments, feedback may be captured in real time, near real time, or asynchronously. Unless otherwise specified, the term "feedback" encompasses any form of information used to inform, train, adjust, evaluate, or refine one or more parameters, models, or processes described herein.

The term "parameter" or "parameters" as used herein refers to any value, variable, weight, coefficient, threshold, vector, setting, or other definable element that influences or determines the behavior, structure, or output of a model, engine, or computational process. In some embodiments, parameters can include numerical values, categorical indicators, probability distributions, or learned representations. In some embodiments, parameters are static, dynamic, predefined, or adaptively modified over time in response to feedback or other contextual inputs. Unless otherwise indicated, the term "parameter" is intended to be interpreted broadly to include any data element, control value, or learned variable used to configure, calibrate, or influence computational, analytical, or relational modeling operations described herein.

The term "engine" as used herein refers to any computational, logical, algorithmic, or procedural component configured to perform one or more operations, functions, or analyses described herein. The term includes, without limitation, artificial intelligence models, machine learning models, neural networks, statistical models, or any adaptive or rule-based system configured to generate, process, or analyze data. Unless otherwise indicated, the term "engine" encompasses both trained models and dynamically learning systems.

The term "computational entity" as used herein refers to any software-based agent, process, model, service, system, or combination thereof configured to generate, evaluate, propose, influence, initiate, or execute one or more actions, operations, or decisions. The term includes, without limitation, artificial intelligence systems, automated agents, services, workflows, orchestration components, and composite or distributed computational systems.

The term "action" as used herein refers to any operation, instruction, transaction, communication, signal, or representation capable of producing an externally observable effect on a system, resource, user, or other entity, whether such effect occurs immediately or at a later time.

The term "execution eligibility" as used herein refers to a determination, assessment, or evaluation of whether a computational entity is permitted to execute, initiate, or cause execution of a proposed action.

The term "relational context" as used herein refers to information describing relationships between computational entities. Such relationships may include, without limitation, delegation, representation, coordination, lineage, temporal scope, constraints, revocation status, conditional authority, and multi-principal authority.

Computing System

Figure 8:
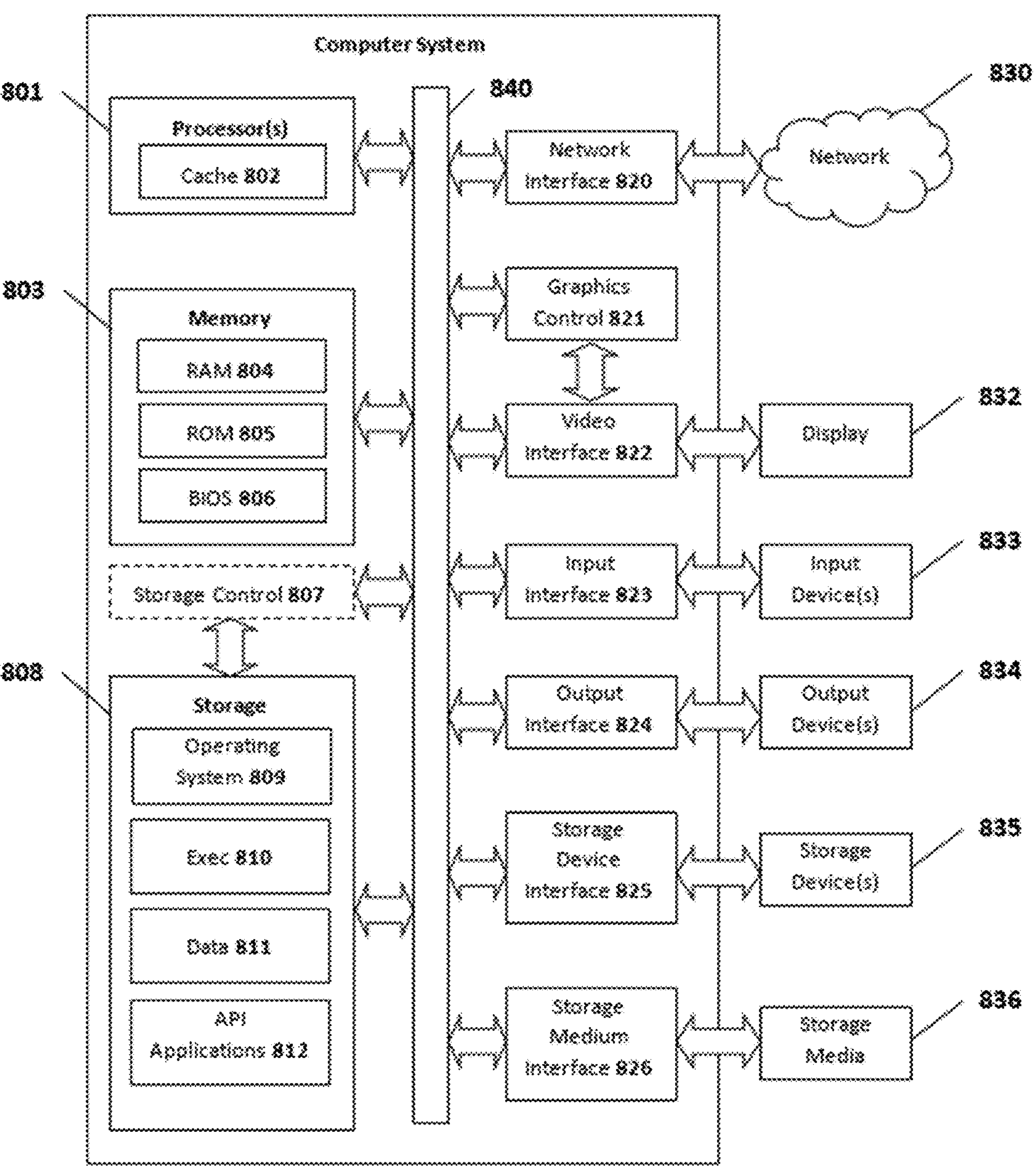
FIG. 8 shows a non-limiting example of a computing device; in this case, a device with one or more processors, memory, storage, and a network interface.

Referring to FIG. 8 a block diagram is shown depicting an exemplary machine that includes a computer system 800 (e.g., a processing or computing system) within which a set of instructions can execute for causing a device to perform or execute any one or more of the aspects and/or methodologies for static code scheduling of the present disclosure. The components in FIG. 8 are examples only and do not limit the scope of use or functionality of any hardware, software, embedded logic component, or a combination of two or more such components implementing particular embodiments.

Computer system 800 may include one or more processors 801, a memory 803, and a storage 808 that communicate with each other, and with other components, via a bus

840. The bus 840 may also link a display 832, one or more input devices 833 (which may, for example, include a keypad, a keyboard, a mouse, a stylus, etc.), one or more output devices 834, one or more storage devices 835, and various tangible storage media 836. All of these elements may interface directly or via one or more interfaces or adaptors to the bus 840. For instance, the various tangible storage media 836 can interface with the bus 840 via storage medium interface 826. Computer system 800 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 800 includes one or more processor(s) 801 (e.g., central processing units (CPUs), general purpose graphics processing units (GPGPUs), or quantum processing units (QPUs)) that carry out functions. Processor(s) 801 optionally contains a cache memory unit 802 for temporary local storage of instructions, data, or computer addresses. Processor(s) 801 are configured to assist in execution of computer readable instructions. Computer system 800 may provide functionality for the components depicted in FIG. 8 as a result of the processor(s) 801 executing non-transitory, processor-executable instructions embodied in one or more tangible computer-readable storage media, such as memory 803, storage 808, storage devices 835, and/or storage medium 836. The computer-readable media may store software that implements particular embodiments, and processor(s) 801 may execute the software. Memory 803 may read the software from one or more other computer-readable media (such as mass storage device(s) 835, 836) or from one or more other sources through a suitable interface, such as network interface 820. The software may cause processor(s) 801 to carry out one or more processes or one or more steps of one or more processes described or illustrated herein. Carrying out such processes or steps may include defining data structures stored in memory 803 and modifying the data structures as directed by the software.

The memory 803 may include various components (e.g., machine readable media) including, but not limited to, a random access memory component (e.g., RAM 804) (e.g., static RAM (SRAM), dynamic RAM (DRAM), ferroelectric random access memory (FRAM), phase-change random access memory (PRAM), etc.), a read-only memory component (e.g., ROM 805), and any combinations thereof. ROM 805 may act to communicate data and instructions unidirectionally to processor(s) 801, and RAM 804 may act to communicate data and instructions bidirectionally with processor(s) 801. ROM 805 and RAM 804 may include any suitable tangible computer-readable media described below. In one example, a basic input/output system 806 (BIOS), including basic routines that help to transfer information between elements within computer system 800, such as during start-up, may be stored in the memory 803.

Fixed storage 808 is connected bidirectionally to processor(s) 801, optionally through storage control unit 807. Fixed storage 808 provides additional data storage capacity and may also include any suitable tangible computer-readable media described herein. Storage 808 may be used to store operating system 809, executable(s) 810, data 811, applications 812 (application programs), and the like. Storage 808 can also include an optical disk drive, a solid-state memory device (e.g., flash-based systems), or a combination of any of the above. Information in storage 808 may, in appropriate cases, be incorporated as virtual memory in memory 803.

In one example, storage device(s) 835 may be removably interfaced with computer system 800 (e.g., via an external port connector (not shown)) via a storage device interface 825. Particularly, storage device(s) 835 and an associated machine-readable medium may provide non-volatile and/or volatile storage of machine-readable instructions, data structures, program modules, and/or other data for the computer system 800. In one example, software may reside, completely or partially, within a machine-readable medium on storage device(s) 835. In another example, software may reside, completely or partially, within processor(s) 801.

Bus 840 connects a wide variety of subsystems. Herein, reference to a bus may encompass one or more digital signal lines serving a common function, where appropriate. Bus 840 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 800 may also include an input device 833. In one example, a user of computer system 800 may enter commands and/or other information into computer system 800 via input device(s) 833. Examples of an input device(s) 833 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 833 may be interfaced to bus 840 via any of a variety of input interfaces 823 (e.g., input interface 823) including, but not limited to, serial, parallel, game port, USB, FIREWIRE, THUNDERBOLT, or any combination of the above.

In particular embodiments, when computer system 800 is connected to network 830, computer system 800 may communicate with other devices, specifically mobile devices and enterprise systems, distributed computing systems, cloud storage systems, cloud computing systems, and the like, connected to network 830. Communications to and from computer system 800 may be sent through network interface 820. For example, network interface 820 may receive incoming communications (such as requests or responses from other devices) in the form of one or more packets (such as Internet Protocol (IP) packets) from network 830, and computer system 800 may store the incoming communications in memory 803 for processing. Computer system 800 may similarly store outgoing communications (such as requests or responses to other devices) in the form of one or more packets in memory 803 and communicated to network 830 from network interface 820. Processor(s) 801 may access these communication packets stored in memory 803 for processing.

Examples of the network interface 820 include, but are not limited to, a network interface card, a modem, and any combination thereof. Examples of a network 830 or network segment 830 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 830, may employ a wired and/or a wireless mode of communication. In general, any network topology may be used.

Information and data can be displayed through a display 832. Examples of a display 832 include, but are not limited to, a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 832 can interface to the processor(s) 801, memory 803, and fixed storage 808, as well as other devices, such as input device(s) 833, via the bus 840. The display 832 is linked to the bus 840 via a video interface 822, and transport of data between the display 832 and the bus 840 can be controlled via the graphics control 821. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 832, computer system 800 may include one or more other peripheral output devices 834 including, but not limited to, an audio speaker, a printer, a storage device, and any combinations thereof. Such peripheral output devices may be connected to the bus 840 via an output interface 824. Examples of an output interface 824 include, but are not limited to, a serial port, a parallel connection, a USB port, a FIREWIRE port, a THUNDERBOLT port, and any combinations thereof.

In addition or as an alternative, computer system 800 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, cloud computing platforms, distributed computing platforms, server clusters, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and PhoneGap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM Blackberry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of psychometric, behavioral, contextual, relationship, demographic, and observational information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

EXAMPLES

The following illustrative examples are representative of embodiments of the applications, systems, and methods described herein and are not meant to be limiting in any way.

Example 1—Action Execution Gating Using Relational Context

In one illustrative embodiment, a system described herein is configured to dictate execution gating of actions initiated by computational entities in a collaborative workflow. The system receives a proposed action from a computational entity, such as a request to approve a document for publication. The system further receives relational context associated with the computational entity, including dynamically updated relationships with one or more additional computational entities. For example, the relational context may indicate that the computational entity has a delegation relationship from a supervisor, a coordination relationship with a peer responsible for reviewing the same document, and a temporal scope indicating the authority to approve is valid only for the current week.

The system computes execution eligibility for the proposed action based on these relationships. For instance, the system evaluates whether delegation from the supervisor is valid, whether the peer has completed the required review task, and whether the temporal authorization has expired. Based on this evaluation, the system produces an execution eligibility.

The system then performs an executive action according to the execution eligibility outcome. For example, if the execution is permitted, the system permits the computational entity to approve the document and triggers the workflow to publish it. In another example, the system may instead modify the proposed action based on the eligibility outcome. For instance, the system may allow approval only for a certain section of the document or require additional confirmation from the supervisor. Finally, the system may prevent execution by blocking the approval action. The system may further generate an explanation specifying why the executive action took place. The explanation can be stored in a log for audit purposes.

During operation, the relational context is dynamically updated to reflect changes in the workflow. For example, if the peer completes the review or the supervisor extends the delegation, the execution eligibility is recomputed, which may allow a previously blocked action to proceed.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method for action execution gating executed at one or more computer processors, the method comprising:

(a) receiving a proposed action generated by a computational entity, wherein the computational entity is an autonomous system configured to generate the proposed action through an internal process, and wherein execution of the proposed action would cause an externally observable state transition in a system distinct from the computational entity;

(b) receiving a relational context associated with the computational entity, the relational context comprising one or more dynamically updated relationships between the computational entity and one or more additional computational entities, and wherein the dynamically updated relationships are updated based on interactions between the computational entity and the one or more additional computational entities; and (c) gating execution of the proposed action by at least:

i) computing an execution eligibility based at least in part on the relational context, wherein the execution eligibility represents a determination of whether the proposed action is permitted to be executed, and wherein computing the execution eligibility is performed independently of the internal process by which the proposed action was generated; and ii) controlling, based on the execution eligibility, an execution channel through which the proposed action would otherwise be executed, wherein the controlling is performed in-line with the execution channel and as a condition precedent to execution of the proposed action, and wherein controlling the execution channel comprises one or more of: permitting, modifying, and preventing execution of the proposed action in a manner that constrains or alters the externally observable state transition.

2. The method of claim 1, wherein the proposed action comprises an operation, instruction, transaction, communication, or representation pertaining to at least one of the one or more additional computational entities.

3. The method of claim 1, wherein the one or more dynamically updated relationships comprise one or more of the following attributes: delegation, representation, coordination, lineage, temporal scope, constraints, revocation, conditional authority, and multi-principal authority.

4. The method of claim 3, wherein the relational context is from a Composite Relational Entity (CRE), wherein the CRE represents the one or more dynamically updated relationships between the computational entity and one or more additional computational entities.

5. The method of claim 1, wherein computing the execution eligibility is not based solely on a static authorization mechanism.

6. The method of claim 1, wherein controlling the execution channel comprises modifying execution of the proposed action based on the execution eligibility.

7. The method of claim 1, further comprising directly performing the proposed action.

8. The method of claim 1, wherein the relational context comprises delegated authority from another computational entity.

9. The method of claim 1, wherein the proposed action is generated using an internal reasoning or planning process of the computational entity and wherein computing the execution eligibility is independent of the internal reasoning or planning process.

10. The method of claim 1, wherein computing the execution eligibility is done jointly across a plurality of computational entities, and wherein computing the execution eligibility is based on each relational context associated with each computational entity of the plurality of computational entities.

11. The method of claim 10, wherein computing the execution eligibility further comprises resolving conflicting relational context associated with each computational entity of the plurality of computational entities.

12. The method of claim 1, wherein the execution eligibility is subject to a temporal expiration or to one or more contextual conditions.

13. The method of claim 1, wherein the relational context comprises lineage information associated with the computational entity.

14. The method of claim 1, further comprising updating the relational context based on one or more interactions between the computational entity and the one or more additional computational entities.

15. The method of claim 1, wherein controlling the execution channel comprises preventing execution of the proposed action, and wherein preventing execution of the proposed action comprises preventing a commitment of a state transition in the system distinct from the computational entity.

16. The method of claim 1, wherein computing the execution eligibility is based at least in part on an approval from an individual.

17. The method of claim 1, further comprising recording the execution eligibility.

18. The method of claim 1, further comprising generating an explanation of a basis for performing the executive action.

19. A computer-implemented system for action execution gating comprising at least one computer processor and instructions executable by the at least one computer processor to provide an application comprising:

(a) a relational context data store configured to store data representing relationships among computational entities, wherein the data is updated dynamically over time; and (b) an eligibility gating engine configured to perform operations comprising:

i) receiving a proposed action initiated by a computational entity, wherein the computational entity is an autonomous system configured to generate the proposed action through an internal process;

ii) receiving a relational context associated with the computational entity from the relational context data store, the relational context comprising one or more dynamically updated relationships between the computational entity and the one or more additional computational entities, and wherein the dynamically updated relationships are updated based on interactions between the computational entity and the one or more additional computational entities;

iii) gating execution of the proposed action by:

1) Computing an execution eligibility based at least in part on the relational context wherein the execution eligibility represents a determination of whether the proposed action is permitted to be executed, and wherein computing the execution eligibility is performed independently of the internal process by which the proposed action was generated; and 2) Controlling, based on the execution eligibility, an execution channel through which the proposed action would otherwise be executed, wherein the controlling is performed in-line with the execution channel and as a condition precedent to execution of the proposed action, and wherein controlling the execution channel comprises one or more of: permitting, modifying, and preventing execution of the proposed action in a manner that constrains or alters the externally observable state transition;

wherein the eligibility gating engine is configured to operate in-line with the execution channel prior to execution of the proposed action.

20. The system of claim 19, wherein the proposed action comprises an operation, instruction, transaction, communication, or representation pertaining to at least one of the one or more additional computational entities.

21. The system of claim 19, wherein the one or more dynamically updated relationships comprise one or more of the following attributes: delegation, representation, coordination, lineage, temporal scope, constraints, revocation, conditional authority, and multi-principal authority.

22. The system of claim 21, wherein the relational context is from a Composite Relational Entity (CRE), wherein the CRE represents the one or more dynamically updated relationships between the computational entity and one or more additional computational entities.

23. The system of claim 19, wherein controlling the execution channel comprises modifying execution of the proposed action based on the execution eligibility.

24. The system of claim 19, wherein the eligibility gating engine is further configured to directly perform the proposed action, and wherein the eligibility gating engine is not configured to compute the execution eligibility based solely on a static authorization mechanism.

25. The system of claim 19, wherein the relational context comprises delegated authority from another computational entity.

26. The system of claim 19, further comprising a role-based access control system, wherein the eligibility gating engine is configured to operate independently of the role-based access control system.

27. The system of claim 19, further comprising a centralized policy engine, wherein the eligibility gating engine is configured to operate independently of the centralized policy engine.

28. The system of claim 19, wherein the computational entity is configured to regenerate, and wherein the eligibility gating engine is configured to calculate the execution eligibility independent of regeneration of the computational entity.

29. The system of claim 28, further comprising a plurality of execution channels, wherein the eligibility gating engine is configured to gate execution of the action at one or more of the plurality of execution channels.

30. A non-transitory computer-readable medium storing instructions that, when executed by one or more computer processors, cause the one or more computer processors to perform operations comprising:

(a) receiving a proposed action generated by a computational entity, wherein the computational entity is an autonomous system configured to generate the proposed action through an internal process, and wherein execution of the proposed action would cause an externally observable state transition in a system distinct from the computational entity;

(b) receiving a relational context associated with the computational entity, the relational context comprising one or more dynamically updated relationships between the computational entity and one or more additional computational entities, and wherein the dynamically updated relationships are updated based on interactions between the computational entity and the one or more additional computational entities; and (c) gating execution of the proposed action by at least:

i) computing an execution eligibility based at least in part on the relational context, wherein the execution eligibility represents a determination of whether the proposed action is permitted to be executed, and wherein computing the execution eligibility is performed independently of the internal process by which the proposed action was generated; and ii) controlling, based on the execution eligibility, an execution channel through which the proposed action would otherwise be executed, wherein the controlling is performed in-line with the execution channel and as a condition precedent to execution of the proposed action, and wherein controlling the execution channel comprises one or more of: permitting, modifying, and preventing execution of the proposed action in a manner that constrains or alters the externally observable state transition.

* * * * *